(12) United States Patent
Matus et al.

(10) Patent No.: US 12,524,040 B2
(45) Date of Patent: Jan. 13, 2026

(54) SYSTEM AND METHOD FOR ASSESSING DEVICE USAGE

(71) Applicant: Credit Karma, LLC, Oakland, CA (US)

(72) Inventors: Jonathan A. Matus, San Francisco, CA (US); Pankaj Risbood, San Francisco, CA (US)

(73) Assignee: Credit Karma, LLC, Oakland, CA (US)

( * ) Notice: Subject to any disclaimer, the term of this patent is extended or adjusted under 35 U.S.C. 154(b) by 198 days.

(21) Appl. No.: 18/236,832

(22) Filed: Aug. 22, 2023

(65) Prior Publication Data

US 2023/0393619 A1 Dec. 7, 2023

Related U.S. Application Data

(63) Continuation of application No. 16/700,991, filed on Dec. 2, 2019, now Pat. No. 11,775,010.

(51) Int. Cl.
*G06F 1/16* (2006.01)
*B60W 40/09* (2012.01)
(Continued)

(52) U.S. Cl.
CPC ........... *G06F 1/1626* (2013.01); *B60W 40/09* (2013.01); *B60W 40/107* (2013.01); *G06F 3/011* (2013.01);
(Continued)

(58) Field of Classification Search
CPC ........ G06F 1/1626; G06F 3/011; G06F 3/017; G06F 3/0482; G06F 3/04883;
(Continued)

(56) References Cited

U.S. PATENT DOCUMENTS 5,673,039 A 9/1997 Pietzsch et al.
5,864,305 A 1/1999 Rosenquist
(Continued)

FOREIGN PATENT DOCUMENTS

CN 108269406 A 7/2018
CN 108431839 A 8/2018
(Continued)

OTHER PUBLICATIONS

Goldstein, Gerry , et al., "Method and System for Selectively Initiating Actions in Accordance with a Driver Risk Analysis", U.S. Appl. No. 18/379,495, filed Oct. 12, 2023.
(Continued)

*Primary Examiner* — Seth A Silverman
(74) *Attorney, Agent, or Firm* — Dinsmore & Shohl LLP

(57) ABSTRACT

A method for monitoring device usage includes: receiving user device information; based on the user interaction data, determining a state associated with the user device; and based on the state of the user device, determining a set of tap parameters. Additionally or alternatively, the method can include any or all of: determining a risk score based on at least on the set of tap parameters; determining an output based on the risk score; and/or any other suitable processes performed in any suitable order.

20 Claims, 7 Drawing Sheets

(51) Int. Cl.
| | |
|---|---|
| *B60W 40/107* | (2012.01) |
| *G06F 3/01* | (2006.01) |
| *G06F 3/0482* | (2013.01) |
| *G06F 3/04883* | (2022.01) |
| *G06F 17/18* | (2006.01) |
| *G06F 18/24* | (2023.01) |
| *G06Q 40/08* | (2012.01) |
| *G06V 10/764* | (2022.01) |
| *G06V 20/59* | (2022.01) |

(52) U.S. Cl.
CPC .......... *G06F 3/017* (2013.01); *G06F 3/0482* (2013.01); *G06F 3/04883* (2013.01); *G06F 17/18* (2013.01); *G06F 18/24* (2023.01); *G06Q 40/08* (2013.01); *G06V 10/764* (2022.01); *G06V 20/597* (2022.01); *B60W 2520/105* (2013.01)

(58) Field of Classification Search
CPC ......... G06F 17/18; G06F 18/24; G06Q 40/08; G06V 10/764; G06V 20/597; B60W 40/09; B60W 40/107
See application file for complete search history.

(56) References Cited

U.S. PATENT DOCUMENTS

| | | | |
|---|---|---|---|
| 6,049,778 | A | 4/2000 | Walker et al. |
| 6,055,477 | A | 4/2000 | Mcburney et al. |
| 6,064,318 | A | 5/2000 | Kirchner et al. |
| 6,178,374 | B1 | 1/2001 | Moehlenkamp et al. |
| 6,240,364 | B1 | 5/2001 | Kerner et al. |
| 6,826,477 | B2 | 11/2004 | Ladetto et al. |
| 6,941,222 | B2 | 9/2005 | Yano et al. |
| 7,065,449 | B2 | 6/2006 | Brewster et al. |
| 7,532,196 | B2 | 5/2009 | Hinckley |
| 7,668,931 | B2 | 2/2010 | Parupudi et al. |
| 7,801,675 | B2 | 9/2010 | Currie et al. |
| 7,881,868 | B2 | 2/2011 | Greene et al. |
| 8,054,168 | B2 | 11/2011 | Mccormick et al. |
| 8,264,375 | B2 | 9/2012 | Devries |
| 8,290,480 | B2 | 10/2012 | Abramson et al. |
| 8,326,257 | B2 | 12/2012 | Shiu et al. |
| 8,352,189 | B2 | 1/2013 | Scott et al. |
| 8,369,876 | B2 | 2/2013 | Bachmann et al. |
| 8,395,542 | B2 | 3/2013 | Scherzinger et al. |
| 8,489,330 | B2 | 7/2013 | Ellanti et al. |
| 8,498,610 | B2 | 7/2013 | Staehlin |
| 8,504,035 | B2 | 8/2013 | Shin et al. |
| 8,521,193 | B2 | 8/2013 | Paek et al. |
| 8,577,703 | B2 | 11/2013 | Mcclellan et al. |
| 8,634,822 | B2 | 1/2014 | Silver et al. |
| 8,731,530 | B1 | 5/2014 | Breed et al. |
| 8,738,523 | B1 | 5/2014 | Sanchez et al. |
| 8,754,766 | B2 | 6/2014 | Oesterling et al. |
| 8,912,103 | B2 | 12/2014 | Heo et al. |
| 8,971,927 | B2 | 3/2015 | Zhou et al. |
| 8,972,103 | B2 | 3/2015 | Elwart et al. |
| 8,989,914 | B1 | 3/2015 | Nemat-Nasser et al. |
| 8,996,234 | B1 | 3/2015 | Tamari et al. |
| 9,064,412 | B2 | 6/2015 | Baur |
| 9,121,940 | B2 | 9/2015 | Psiaki et al. |
| 9,141,974 | B2 | 9/2015 | Jones et al. |
| 9,185,526 | B2 | 11/2015 | Guba et al. |
| 9,188,451 | B2 | 11/2015 | Magnusson et al. |
| 9,221,428 | B2 | 12/2015 | Kote et al. |
| 9,222,798 | B2 | 12/2015 | Curtis et al. |
| 9,224,293 | B2 | 12/2015 | Taylor |
| 9,250,090 | B2 | 2/2016 | Hille et al. |
| 9,311,211 | B2 | 4/2016 | Chatterjee et al. |
| 9,311,271 | B2 | 4/2016 | Wright |
| 9,360,323 | B2 | 6/2016 | Grokop |
| 9,368,027 | B2 | 6/2016 | Jang et al. |
| 9,390,625 | B2 | 7/2016 | Green et al. |
| 9,414,221 | B1 | 8/2016 | Simon et al. |
| 9,423,318 | B2 | 8/2016 | Liu et al. |
| 9,449,495 | B1 | 9/2016 | Call et al. |
| 9,457,754 | B1 | 10/2016 | Christensen et al. |
| 9,467,515 | B1 | 10/2016 | Penilla et al. |
| 9,495,601 | B2 | 11/2016 | Hansen |
| 9,536,428 | B1 | 1/2017 | Wasserman |
| 9,558,520 | B2 | 1/2017 | Peak et al. |
| 9,564,047 | B2 | 2/2017 | Wu |
| 9,566,981 | B2 | 2/2017 | Rebhan et al. |
| 9,587,952 | B1 | 3/2017 | Slusar |
| 9,628,975 | B1 | 4/2017 | Watkins et al. |
| 9,632,507 | B1 | 4/2017 | Korn |
| 9,633,487 | B2 | 4/2017 | Wright |
| 9,645,970 | B2 | 5/2017 | Boesch et al. |
| 9,650,007 | B1 | 5/2017 | Snyder et al. |
| 9,674,370 | B2 | 6/2017 | Kim et al. |
| 9,689,698 | B2 | 6/2017 | Wesselius et al. |
| 9,716,978 | B2 | 7/2017 | Sankaran |
| 9,731,713 | B2 | 8/2017 | Horii |
| 9,773,281 | B1 | 9/2017 | Hanson |
| 9,794,729 | B2 | 10/2017 | Meyers et al. |
| 9,800,716 | B2 | 10/2017 | Abramson et al. |
| 9,801,027 | B2 | 10/2017 | Levy et al. |
| 9,805,601 | B1 | 10/2017 | Fields et al. |
| 9,818,239 | B2 | 11/2017 | Pal et al. |
| 9,842,120 | B1 | 12/2017 | Siris et al. |
| 9,852,475 | B1 | 12/2017 | Konrardy et al. |
| 9,854,396 | B2 | 12/2017 | Himmelreich et al. |
| 9,857,182 | B2 * | 1/2018 | Huijnen .............. G01C 21/3476 |
| 9,868,394 | B1 | 1/2018 | Fields et al. |
| 9,870,649 | B1 | 1/2018 | Fields et al. |
| 9,888,392 | B1 | 2/2018 | Snyder et al. |
| 9,900,747 | B1 | 2/2018 | Park |
| 9,932,033 | B2 | 4/2018 | Slusar et al. |
| 9,994,218 | B2 | 6/2018 | Pal et al. |
| 9,996,811 | B2 | 6/2018 | Matus et al. |
| 10,012,993 | B1 | 7/2018 | Matus et al. |
| 10,137,889 | B2 | 11/2018 | Pal et al. |
| 10,154,382 | B2 | 12/2018 | Matus |
| 10,157,423 | B1 | 12/2018 | Fields et al. |
| 10,176,524 | B1 | 1/2019 | Brandmaier et al. |
| 10,304,329 | B2 | 5/2019 | Matus et al. |
| 10,319,037 | B1 | 6/2019 | Chan et al. |
| 10,324,463 | B1 | 6/2019 | Konrardy et al. |
| 10,386,192 | B1 | 8/2019 | Konrardy et al. |
| 10,510,123 | B1 | 12/2019 | Konrardy et al. |
| 10,533,870 | B1 | 1/2020 | Slusar |
| 10,559,196 | B2 | 2/2020 | Matus et al. |
| 10,599,155 | B1 | 3/2020 | Konrardy et al. |
| 10,631,147 | B2 | 4/2020 | Matus et al. |
| 10,759,441 | B1 | 9/2020 | Balakrishnan et al. |
| 10,824,145 | B1 | 11/2020 | Konrardy et al. |
| 10,848,913 | B2 | 11/2020 | Pal et al. |
| 10,872,525 | B2 | 12/2020 | Xu et al. |
| 10,885,592 | B2 | 1/2021 | Hsu-Hoffman et al. |
| 10,983,523 | B2 | 4/2021 | Sim |
| 11,069,157 | B2 | 7/2021 | Matus |
| 11,170,446 | B1 | 11/2021 | Thurber |
| 11,175,152 | B2 | 11/2021 | Pal et al. |
| 11,205,232 | B1 | 12/2021 | Chan et al. |
| 12,192,865 | B2 * | 1/2025 | Matus .................. H04W 4/40 |
| 2002/0161517 | A1 | 10/2002 | Yano et al. |
| 2002/0161518 | A1 | 10/2002 | Petzold et al. |
| 2003/0018430 | A1 | 1/2003 | Ladetto et al. |
| 2004/0046335 | A1 | 3/2004 | Knox et al. |
| 2004/0082311 | A1 | 4/2004 | Shiu et al. |
| 2005/0080555 | A1 | 4/2005 | Parupudi et al. |
| 2005/0093868 | A1 | 5/2005 | Hinckley |
| 2005/0197773 | A1 | 9/2005 | Brewster et al. |
| 2005/0288856 | A1 | 12/2005 | Ohki et al. |
| 2006/0153198 | A1 | 7/2006 | Chadha |
| 2007/0005228 | A1 | 1/2007 | Sutardja |
| 2007/0208494 | A1 | 9/2007 | Chapman et al. |
| 2007/0208501 | A1 | 9/2007 | Downs et al. |
| 2008/0033776 | A1 | 2/2008 | Marchese |
| 2008/0103907 | A1 | 5/2008 | Maislos et al. |
| 2008/0243439 | A1 | 10/2008 | Runkle et al. |
| 2008/0312832 | A1 | 12/2008 | Greene et al. |

(56) References Cited

U.S. PATENT DOCUMENTS

| | | |
|---|---|---|
| 2009/0024419 A1 | 1/2009 | Mcclellan et al. |
| 2010/0030582 A1 | 2/2010 | Rippel et al. |
| 2010/0056175 A1 | 3/2010 | Bachmann et al. |
| 2010/0100398 A1 | 4/2010 | Auker et al. |
| 2010/0106406 A1 | 4/2010 | Hille et al. |
| 2010/0131304 A1 | 5/2010 | Collopy et al. |
| 2010/0198517 A1 | 8/2010 | Scott et al. |
| 2010/0219944 A1 | 9/2010 | Mc et al. |
| 2010/0273508 A1 | 10/2010 | Parata et al. |
| 2010/0299021 A1 | 11/2010 | Jalili |
| 2010/0332131 A1 | 12/2010 | Horvitz et al. |
| 2011/0077028 A1 | 3/2011 | Wilkes et al. |
| 2011/0124311 A1 | 5/2011 | Staehlin |
| 2011/0161116 A1 | 6/2011 | Peak et al. |
| 2011/0224898 A1 | 9/2011 | Scofield et al. |
| 2011/0246156 A1 | 10/2011 | Zecha et al. |
| 2011/0294520 A1 | 12/2011 | Zhou et al. |
| 2012/0050095 A1 | 3/2012 | Scherzinger et al. |
| 2012/0065871 A1 | 3/2012 | Deshpande et al. |
| 2012/0066053 A1 | 3/2012 | Agarwal |
| 2012/0071151 A1 | 3/2012 | Abramson et al. |
| 2012/0089328 A1 | 4/2012 | Ellanti et al. |
| 2012/0109517 A1 | 5/2012 | Watanabe |
| 2012/0129545 A1 | 5/2012 | Hodis et al. |
| 2012/0136529 A1 | 5/2012 | Curtis et al. |
| 2012/0136567 A1 | 5/2012 | Wang et al. |
| 2012/0149400 A1 | 6/2012 | Paek et al. |
| 2012/0158820 A1 | 6/2012 | Bai et al. |
| 2012/0197587 A1 | 8/2012 | Luk et al. |
| 2012/0226421 A1 | 9/2012 | Kote et al. |
| 2012/0245963 A1 | 9/2012 | Peak et al. |
| 2013/0006469 A1 | 1/2013 | Green et al. |
| 2013/0041521 A1 | 2/2013 | Basir et al. |
| 2013/0052614 A1 | 2/2013 | Mollicone et al. |
| 2013/0069802 A1 | 3/2013 | Foghel et al. |
| 2013/0096731 A1 | 4/2013 | Tamari et al. |
| 2013/0124074 A1 | 5/2013 | Horvitz et al. |
| 2013/0130639 A1 | 5/2013 | Oesterling et al. |
| 2013/0144461 A1 | 6/2013 | Ricci |
| 2013/0204515 A1 | 8/2013 | Emura |
| 2013/0211618 A1 | 8/2013 | Iachini |
| 2013/0282264 A1 | 10/2013 | Bastiaensen et al. |
| 2013/0289819 A1 | 10/2013 | Hassib et al. |
| 2013/0302758 A1 | 11/2013 | Wright |
| 2013/0316737 A1 | 11/2013 | Guba et al. |
| 2013/0317860 A1 | 11/2013 | Schumann |
| 2013/0325517 A1 | 12/2013 | Berg |
| 2013/0332357 A1 | 12/2013 | Green et al. |
| 2013/0344856 A1 | 12/2013 | Silver et al. |
| 2014/0038640 A1 | 2/2014 | Wesselius et al. |
| 2014/0046896 A1 | 2/2014 | Potter |
| 2014/0074402 A1 | 3/2014 | Hassib et al. |
| 2014/0081670 A1 | 3/2014 | Lim et al. |
| 2014/0187219 A1 | 7/2014 | Yang et al. |
| 2014/0188638 A1 | 7/2014 | Jones et al. |
| 2014/0197967 A1 | 7/2014 | Modica et al. |
| 2014/0207497 A1 | 7/2014 | Collins et al. |
| 2014/0232592 A1 | 8/2014 | Psiaki et al. |
| 2014/0244150 A1 | 8/2014 | Boesch et al. |
| 2014/0244156 A1 | 8/2014 | Magnusson et al. |
| 2014/0288765 A1 | 9/2014 | Elwart et al. |
| 2014/0288828 A1 | 9/2014 | Werner et al. |
| 2014/0358321 A1 | 12/2014 | Ibrahim |
| 2014/0358394 A1 | 12/2014 | Picciotti |
| 2015/0025917 A1 | 1/2015 | Stempora |
| 2015/0046197 A1 | 2/2015 | Peng et al. |
| 2015/0084757 A1 | 3/2015 | Annibale et al. |
| 2015/0087264 A1 | 3/2015 | Goyal |
| 2015/0097703 A1 | 4/2015 | Baur |
| 2015/0112731 A1 | 4/2015 | Binion et al. |
| 2015/0187146 A1 | 7/2015 | Chen et al. |
| 2015/0229666 A1 | 8/2015 | Foster et al. |
| 2015/0233718 A1 | 8/2015 | Grokop |
| 2015/0246654 A1 | 9/2015 | Tadic et al. |
| 2015/0327034 A1 | 11/2015 | Abramson et al. |
| 2015/0329121 A1 | 11/2015 | Lim et al. |
| 2015/0332407 A1 | 11/2015 | Wilson et al. |
| 2015/0334545 A1 | 11/2015 | Maier et al. |
| 2016/0021238 A1 | 1/2016 | Abramson et al. |
| 2016/0033366 A1 | 2/2016 | Liu et al. |
| 2016/0036964 A1 | 2/2016 | Barfield et al. |
| 2016/0042767 A1 | 2/2016 | Araya et al. |
| 2016/0048399 A1 | 2/2016 | Shaw |
| 2016/0059855 A1 | 3/2016 | Rebhan et al. |
| 2016/0068156 A1 | 3/2016 | Horii |
| 2016/0086285 A1 | 3/2016 | Jordan et al. |
| 2016/0129913 A1 | 5/2016 | Boesen |
| 2016/0133130 A1 | 5/2016 | Grimm et al. |
| 2016/0140404 A1 | 5/2016 | Rosen |
| 2016/0150070 A1 | 5/2016 | Goren et al. |
| 2016/0171521 A1 | 6/2016 | Ramirez et al. |
| 2016/0174049 A1 | 6/2016 | Levy et al. |
| 2016/0189303 A1 | 6/2016 | Fuchs |
| 2016/0189442 A1 | 6/2016 | Wright |
| 2016/0225263 A1 | 8/2016 | Salentiny et al. |
| 2016/0232785 A1 | 8/2016 | Wang |
| 2016/0269852 A1 | 9/2016 | Meyers et al. |
| 2016/0272140 A1 | 9/2016 | Kim et al. |
| 2016/0282156 A1 | 9/2016 | Ott et al. |
| 2016/0325756 A1 | 11/2016 | Cordova et al. |
| 2016/0328893 A1 | 11/2016 | Cordova et al. |
| 2016/0339910 A1 | 11/2016 | Jonasson et al. |
| 2016/0358315 A1 | 12/2016 | Zhou et al. |
| 2016/0364983 A1 | 12/2016 | Downs et al. |
| 2016/0375908 A1 | 12/2016 | Biemer |
| 2016/0379310 A1 | 12/2016 | Madigan et al. |
| 2016/0379485 A1 | 12/2016 | Anastassov et al. |
| 2016/0381505 A1 | 12/2016 | Sankaran |
| 2017/0034656 A1 | 2/2017 | Wang et al. |
| 2017/0053461 A1 | 2/2017 | Pal et al. |
| 2017/0057518 A1 | 3/2017 | Finegold et al. |
| 2017/0097243 A1 | 4/2017 | Ricci |
| 2017/0103342 A1 | 4/2017 | Rajani et al. |
| 2017/0103588 A1 | 4/2017 | Rajani et al. |
| 2017/0105098 A1 | 4/2017 | Cordova et al. |
| 2017/0115125 A1 | 4/2017 | Outwater et al. |
| 2017/0116792 A1 | 4/2017 | Jelinek et al. |
| 2017/0124660 A1 | 5/2017 | Srivastava |
| 2017/0126810 A1 | 5/2017 | Kentley et al. |
| 2017/0138737 A1 | 5/2017 | Cordova et al. |
| 2017/0164158 A1 | 6/2017 | Watkins et al. |
| 2017/0178416 A1 | 6/2017 | Barreira Avegliano et al. |
| 2017/0178422 A1 | 6/2017 | Wright |
| 2017/0178424 A1 | 6/2017 | Wright |
| 2017/0210323 A1 | 7/2017 | Cordova et al. |
| 2017/0211939 A1 | 7/2017 | Cordova et al. |
| 2017/0232963 A1 | 8/2017 | Pal et al. |
| 2017/0234689 A1 | 8/2017 | Gibson et al. |
| 2017/0241791 A1 | 8/2017 | Madigan et al. |
| 2017/0279947 A1 | 9/2017 | Rajakarunanayake et al. |
| 2017/0289754 A1 | 10/2017 | Anderson et al. |
| 2017/0369055 A1 | 12/2017 | Saigusa et al. |
| 2017/0371608 A1 | 12/2017 | Wasserman |
| 2018/0061230 A1 | 3/2018 | Madigan et al. |
| 2018/0075309 A1 | 3/2018 | Sathyanarayana et al. |
| 2018/0090001 A1 | 3/2018 | Fletcher |
| 2018/0154908 A1 | 6/2018 | Chen |
| 2018/0158329 A1 | 6/2018 | Benhammou et al. |
| 2018/0165531 A1 | 6/2018 | Sathyanarayana et al. |
| 2018/0174446 A1 | 6/2018 | Wang |
| 2018/0276485 A1 | 9/2018 | Heck et al. |
| 2018/0308128 A1 | 10/2018 | Deluca et al. |
| 2018/0338033 A1* | 11/2018 | Boule ............... G01S 19/52 |
| 2019/0007511 A1 | 1/2019 | Rodriguez et al. |
| 2019/0035266 A1 | 1/2019 | Riess et al. |
| 2019/0251844 A1* | 8/2019 | Crasso ............... G08G 1/164 |
| 2019/0281416 A1 | 9/2019 | Watkins et al. |
| 2019/0295133 A1 | 9/2019 | Hirtenstein et al. |
| 2020/0216078 A1 | 7/2020 | Katz |
| 2021/0163016 A1 | 6/2021 | Matus et al. |
| 2021/0309261 A1 | 10/2021 | Rosales et al. |
| 2022/0005291 A1 | 1/2022 | Konrardy et al. |

(56) References Cited

U.S. PATENT DOCUMENTS

| | | |
|---|---|---|
| 2022/0180448 A1 | 6/2022 | Konrardy et al. |
| 2022/0292613 A1 | 9/2022 | Risbood et al. |
| 2023/0271618 A1 | 8/2023 | Chandra et al. |

FOREIGN PATENT DOCUMENTS

| | | |
|---|---|---|
| CN | 108819841 A | 11/2018 |
| DE | 3439000 A1 | 4/1986 |
| DE | 102008008555 | 8/2008 |
| DE | 102017221643 A1 | 7/2018 |
| EP | 0534892 A1 | 3/1993 |
| EP | 3022705 A2 | 5/2016 |
| EP | 3638542 B1 | 1/2022 |
| GB | 2492369 B | 4/2014 |
| JP | 2000009482 A | 1/2000 |
| JP | 2002215236 A | 7/2002 |
| JP | 2005098904 A | 4/2005 |
| JP | 2007212265 A | 8/2007 |
| JP | 2009133702 A | 6/2009 |
| JP | 2011133240 A | 7/2011 |
| JP | 2013195143 A | 9/2013 |
| JP | 2013200223 A | 10/2013 |
| KR | 20130106106 A | 9/2013 |
| WO | 2004085220 | 10/2004 |
| WO | 2006000166 A1 | 1/2006 |
| WO | 2015122729 A1 | 8/2015 |

OTHER PUBLICATIONS

"Credit Karma launches Karma Drive, a simple way to qualify for an auto insurance discount in as few as 30 days", Dec. 17, 2020, Credit Karma Press Room, https://www.creditkarma.com/about/releases/credit-karma-launches-karma-drive-a-simple-way-to-qualify-for-an-auto-insurance-discount-in-as-few-as-30-days.

Chandra, Sakshi, et al., "Method and System for Detecting Lateral Driving Behavior", U.S. Appl. No. 18/115,626, filed Feb. 28, 2023.

Chu, Hon Lung, "In-Vehicle Driver Detection Using Mobile Phone Sensors", https://ece.duke.edu/sites/ece.duke.edu/files/GWDD2011_Chu.pdf—2011 (Year: 2011).

Das, Tathagata, et al., "Prism: Platform for Remote Sensing using Smartphones", In. Proc. Mobisys '10, Jun. 15-18, 2010, San Francisco, USA, pp. 63-76., Jan. 2, 2018 00:00:00.0.

Giuseppe, Guido, et al., "Using Smartphones as a Tool to Capture Road Traffic Attributes", Applied Mechanics and Materials vol. 432 (2013) pp. 513-519.

Jiangqiang, et al., "Driver Pre-Accident Operation Mode Study Based on Vehicle-Vehicle Traffic Accidents", 2011, Publisher: IEEE.

Kalra, Nidhi, "Analyzing Driving and Road Events via Smartphone", International Journal of Computer Applications (0975-8887), vol. 98—No. 12, Jul. 2014, pp. 5-9.

Liang-Bi, et al., "An Implementation of Deep Learning based IoV System for Traffic Accident Collisions Detection with an Emergency Alert Mechanism", 2018, Publisher: IEE.

Mohan, Prashanth, et al., "Nericell: Rich Monitoring of Road and Traffic Conditions using Mobile Smartphones", SenSys '08, Nov. 5-7, 2008, Raleigh, North Carolina., Feb. 28, 2018 00:00:00.0.

Pattara-Atikom, W., et al., "Estimating Road Traffic Congestion using Vehicle Velocity", 2006, Publisher: IEEE.

Short, Jeffrey, et al., "Identifying Autonomous Vehicle Technology Impacts on the Trucking Industry", http://atri-online.org/wp-content/uploads/2016/11/ATRI-Autonomous-Vehicle-Impacts-11-2016.pdf (Year: 2016).

Tathagata, Das, et al., "Prism: Platform for Remote Sensing using Smartphones", In. Proc. Mobisys '10, Jun. 15-18, 2010, San Francisco, USA, pp. 63-76.

Walter, D., et al., "Novel Environmental Features for Robust Multisensor Navigation", Proceedings of the 26th International Technical Meeting of the Satellite Division of the Institute of Navigation (ION GNSS+ 2013) Sep. 16-20, 2013 Nashville Convention Center, Nashville, Tennessee.

\* cited by examiner

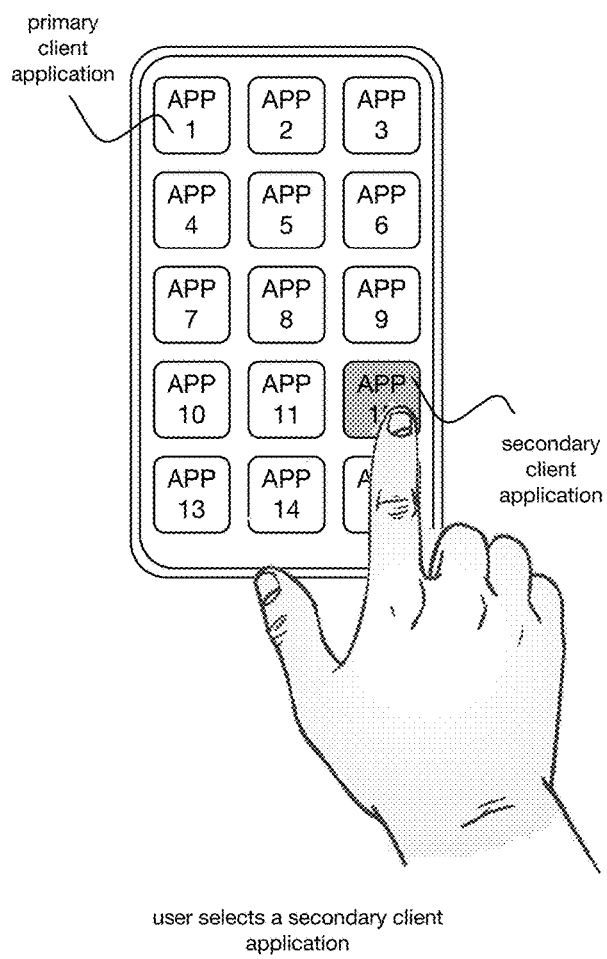
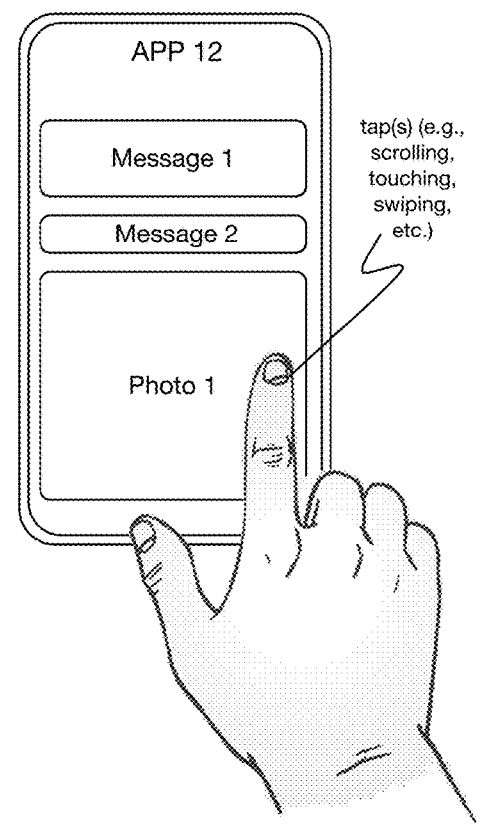
user selects a secondary client application
FIGURE 3A
user interacts with secondary client application
FIGURE 3B Determining a risk score through indirect measurement of user activity associated with APP 12

SYSTEM AND METHOD FOR ASSESSING DEVICE USAGE

CROSS-REFERENCE TO RELATED APPLICATIONS

This application is a continuation of U.S. application Ser. No. 16/700,991, filed 2 Dec. 2019, which is incorporated in its entirety by this reference, and which is related to U.S. application Ser. No. 14/566,408, filed 10 Dec. 2014, and U.S. application Ser. No. 15/835,284, filed 7 Dec. 2017, each of which is incorporated in its entirety by this reference.

TECHNICAL FIELD

This invention relates generally to the vehicular activity monitoring field, and more specifically to a new and useful system and method for monitoring device usage by a user in the vehicle activity monitoring field.

BACKGROUND

A user's driving behavior, such as the riskiness of their driving behavior, is dependent upon many factors. A large factor in recent years has been device usage while driving, such as texting, calling, engaging an application, and various other behaviors. While some conventional systems and methods can approximate that a mobile device is in a vehicle, there are various different ways in which the user can interact with the device, each of which can be associated with vastly different levels of risk.

Thus, there is a need in the vehicle monitoring field to create a new and useful system and method for assessing and properly classifying mobile device usage associated with a driver of a vehicle.

BRIEF DESCRIPTION OF THE FIGURES

FIGS. 3A-3C depict a variation detecting user interaction with a secondary client application.

DESCRIPTION OF THE PREFERRED EMBODIMENTS

The following description of the preferred embodiments of the invention is not intended to limit the invention to these preferred embodiments, but rather to enable any person skilled in the art to make and use this invention.

1. Overview

Figure 1:
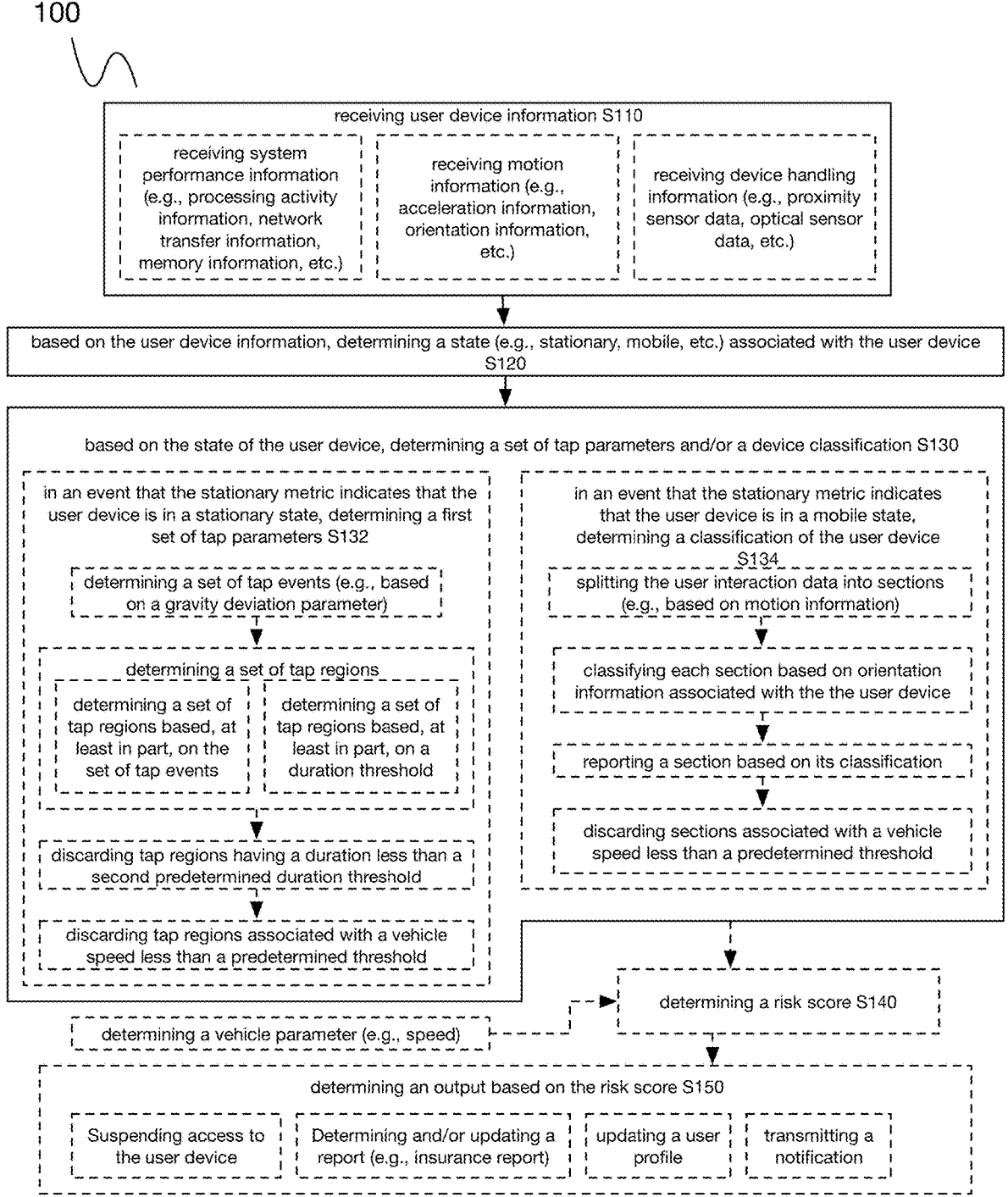
FIG. 1 is a schematic representation of a method 100 for assessing device usage.

As shown in FIG. 1, a method 100 for monitoring device usage includes: receiving user device information S110; based on the user interaction data, determining a state associated with the user device S120; and based on the state of the user device, determining a set of tap parameters and/or a device classification S130. Additionally or alternatively, the method 100 can include any or all of: determining a risk score S140; determining an output based on the risk score S150; and/or any other suitable processes performed in any suitable order.

Figure 2:
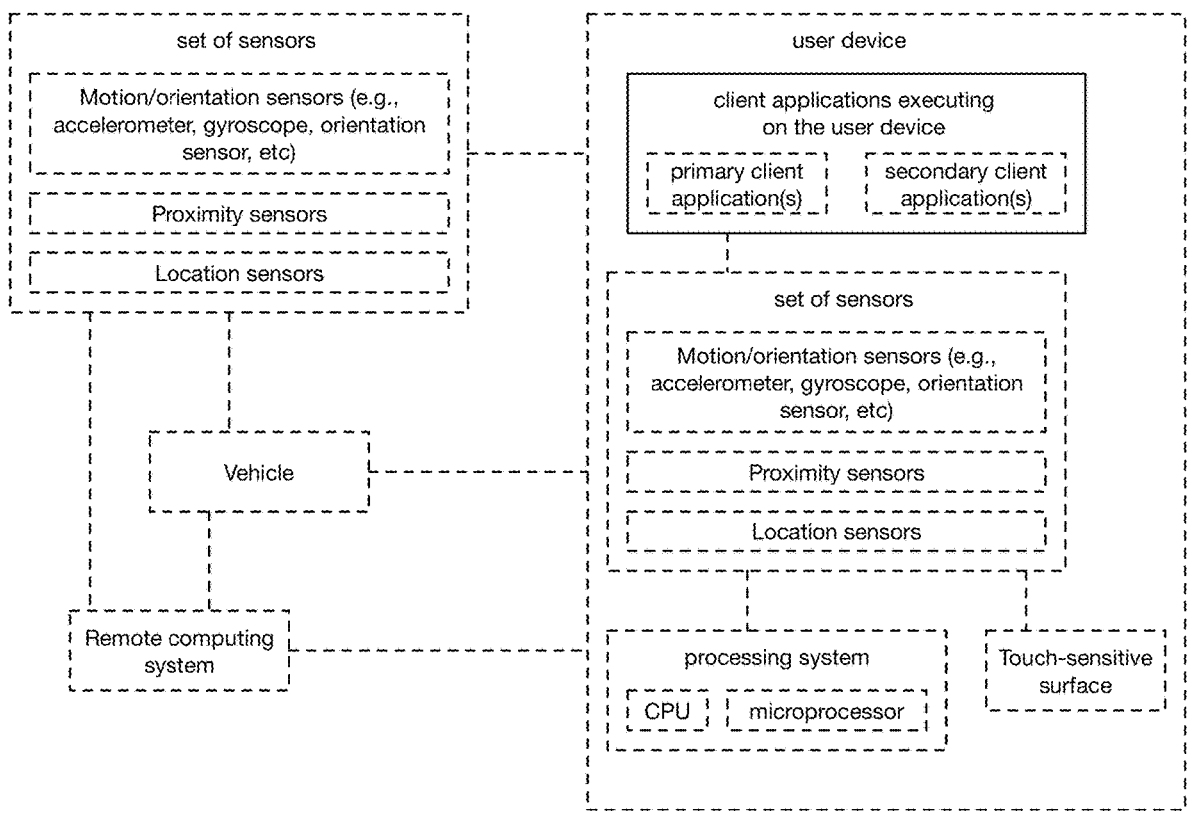
FIG. 2 is a schematic representation of a system 200 for assessing device usage.

As shown in FIG. 2, a system 200 for monitoring device usage includes: a client application executing on a user device. Additionally or alternatively, the system 200 can include and/or be configured to interface with any or all of: a set of sensors, a user device, a processing system, a computing system (e.g., remote computing system), a vehicle, and/or any other suitable component(s).

2. Benefits

Variations of the system and method can confer various benefits over existing systems and methods.

First, in some variations, the system and/or method confers the benefit of distinguishing between various types of device usage by a driver, each of which can be associated with different levels of risk. In specific examples, the method confers the benefit of enabling a determination to be made of whether the user is engaging with a mobile device while the mobile device is being held by a user or while the mobile device is in a mount/holder (e.g., mounted to a dashboard of the vehicle). This information can be used by an insurance company to appropriately assess the riskiness of a driver. In other specific examples, additional or alternative to these, the system and/or method can be used to provide feedback (e.g., notification of time spent in a state of distracted driving, risk score, etc.) and/or another output (e.g., suspension of device usage while driving) to the driver and/or another suitable user.

Second, in some variations, the system and/or method confers the benefit of minimizing a number of false positives associated with the driver engaging in device usage behavior. In specific examples, for instance, the system and/or method, in assessing device usage, takes into account a central processing unit (CPU) spiking for reasons (e.g., downloading data, transitioning between songs in an audio application, etc.) unrelated to device usage by the user.

Third, in some variations, the system and/or method confers the benefit of assessing device usage associated with a mobile device based only on data collected at the mobile device. In specific examples, for instance, any or all of motion data, processing data, and proximity/contact data can be used to determine device usage.

Figure 3C:
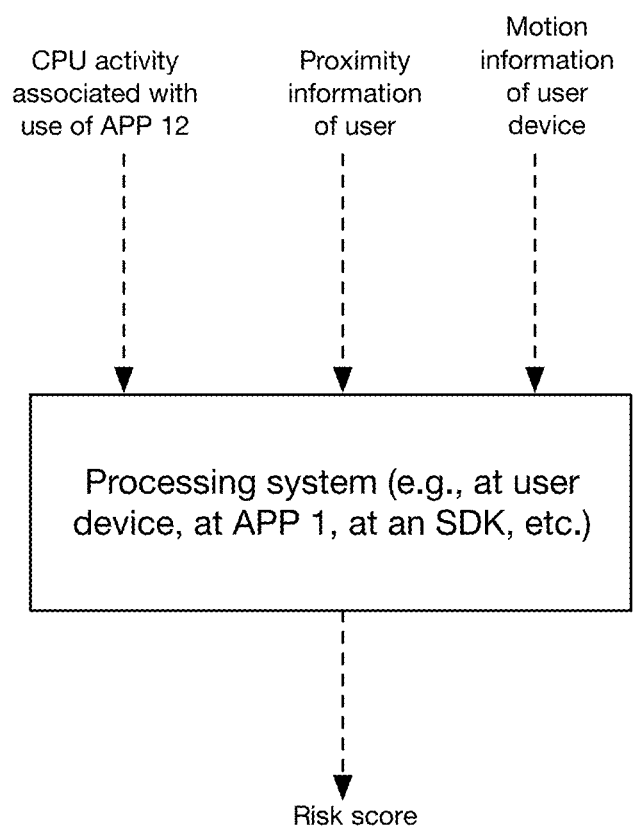

Fourth, in some variations (e.g., as shown in FIGS. 3A-3C), the system and/or method confers the benefit of assessing a user's interaction at a secondary client application with a primary client application, wherein information is not directly received at the primary client application from the secondary client application. In specific examples, for instance, a telematics client application can indirectly assess usage of a secondary client application through the detection and processing of any or all of: motion information of the user device (e.g., from an accelerometer, from a gyroscope, etc.), orientation information of the user device (e.g., from a gyroscope, from an orientation sensor, etc.), proximity information (e.g., from a proximity sensor of the user device), processing activity of the user device (e.g., CPU activity, network transfer information, available free memory, etc.), and/or any other suitable sensor information.

Additionally or alternatively, the system and/or method can confer any other suitable benefit(s).

3. System

The system 200 functions to provide information with which to assess a device usage by a user. Additionally or alternatively, the system 200 can function to perform at least a portion of the processing required to determine a device usage, transfer information to another entity (e.g., remote computing system) at which the processing is performed, produce an output, and/or perform any other suitable function.

The system 200 can include and/or be configured to interface with a user device, wherein the device usage is associated with the user device. Examples of the user device include a tablet, smartphone, mobile phone, laptop, watch, wearable device (e.g., glasses), or any other suitable user device. The user device can include power storage (e.g., a battery), processing systems (e.g., CPU, GPU, memory, etc.), user outputs (e.g., display, speaker, vibration mechanism, etc.), user inputs (e.g., a keyboard, touchscreen, microphone, etc.), a location system (e.g., a GPS system), sensors (e.g., optical sensors, such as light sensors and cameras, orientation sensors, such as accelerometers, gyroscopes, and altimeters, audio sensors, such as microphones, magnetometers, etc.), data communication system (e.g., a WiFi transceiver(s), Bluetooth transceiver(s), cellular transceiver(s), etc.), or any other suitable component.

The system 200 can additionally include and/or be configured to interface with a set of sensors (e.g., as part of user device, separate from user device, etc.), which can include any or all of: motion sensors (e.g., accelerometer, gyroscope, magnetometer, orientation sensor, etc.), which can function to detect any or all of: user device movement, user device orientation, vehicle movement, vehicle orientation, position of user device within the vehicle, and/or any other suitable information; proximity sensors (e.g., optical sensors, capacitive sensors, etc.), which can function to detect and/or classify a user's handling of a user device; location sensors (e.g., GPS); any or all of the sensors described above; any or all of the sensors described below; and/or any other suitable sensors.

In addition to or alternative to the information described below in the method 100, the sensor system can collect any or all of the following user activity data and vehicle data. User activity data (e.g., user activity datasets) can include any one or more of: device datasets (e.g., describing devices associated with the user; historical pairings and/or communications with other devices, such as vehicles and/or other user devices via Bluetooth or other communication protocols; etc.); behavioral datasets (e.g., behavior data upon which user activity models can be based or generated for users and/or user accounts; social media datasets derived from social media actions taken by the user and/or related to the user, which can indicate user activity states corresponding to social media actions; physical activity datasets associated with movement patterns of the user; etc.); demographic datasets (e.g., nationality, ethnicity, age, gender, etc.); device event datasets (e.g., associated with text messaging; phone calling; device idling; device charging; application usage; sensor usage; intelligent personal assistants; outputs such as media casting; inputs; etc.), and/or any other suitable datasets associated with a user. Vehicle data can include any one or more of: proximity sensor data (e.g., radar, electromagnetic sensor data, ultrasonic sensor data, light detection and ranging, light amplification for detection and ranging, line laser scanner, laser detection and ranging, airborne laser swath mapping, laser altimetry, sonar, etc.), vehicle camera data (e.g., in-car cameras, exterior cameras, back-up cameras, dashboard cameras, front-view cameras, side-view cameras, image recognition data, infrared camera, 3D stereo camera, monocular camera, etc.), car speed, RPM data, odometer, altimeter, location sensor data (e.g., GPS data, compass data, etc.), motion sensor data (e.g., from an accelerometer, gyroscope, etc.), environmental data (e.g., pressure, temperature, etc.), light sensor data (e.g., from infrared sensors, ambient light sensors, etc.), fuel level (e.g., percentile-based, distance-based, low warning, etc.), fuel system status, oxygen sensor data, throttle position, gear data (e.g., drive, neutral, park, reverse, gear number, etc.), HVAC data (e.g., current temperature, target temperature, etc.), driving status (e.g., restricted features such as user inputs into control panel, unrestricted features, etc.), connectedness status (e.g., near-field communication pairing between the vehicle and a user's mobile device), and/or any other suitable vehicle data. For example, vehicle data can be used in comparisons with mobile device-derived movement data in training, updating, and/or otherwise processing computational models described herein and/or other suitable models. However, supplementary data types can be configured in any suitable manner.

The system 200 can include one or more client applications executing on the user device, which can function to collect information with which to determine a device usage and/or perform any or all of the processing required to determine the device usage.

The client applications can include a primary client application, which is preferably a telematics application, which functions to receive information from one or more sensors (e.g., as described in S110). Additionally or alternatively, the primary client application can perform any or all of the process required to determine a device usage.

The client applications can optionally include one or more secondary client applications (e.g., messaging applications, native user device applications, social media applications, viewer applications, Facebook, YouTube, etc.), wherein the primary client application indirectly detects usage of (e.g., without directly receiving data from) the secondary client applications (e.g., as shown in FIGS. 3A-3C).

Additionally or alternatively, the client applications can be otherwise arranged or described.

The system 200 preferably interfaces with a vehicle, wherein the device usage is determined for a user driving the vehicle and to which the user device (equivalently referred to herein as a mobile device) is optionally removably coupled (e.g., at a mount).

The vehicle to which the mobile electronic device is removably coupled (e.g., present within, mounted to an interior of, etc.), and in the context of which variations of the method 100 can be implemented, can be an automotive vehicle (e.g., a car, truck, SUV, etc.), a light electric vehicle (e.g., an electric bike, an electric scooter, an electric skateboard, any other suitable electric vehicle that is configured to carry at least one human, etc.), an aerial vehicle (e.g., a fixed wing aircraft, a rotary wing aircraft, a drone, a hovercraft, etc.), a mass transit land vehicle (e.g., a bus, a locomotive train, a light-rail train, etc.), an aquatic vehicle (e.g., a pleasure craft, a ferry, a hydrofoil craft, etc.), and/or any other suitable vehicle.

Additionally or alternatively, the system 200 can include any other suitable components and/or be otherwise configured.

4. Method

The method 100 functions to assess the usage of a mobile device by a user driving a vehicle. Additionally or alternatively, the method 100 can function to distinguish between multiple types of device usage (e.g., phone call vs. texting vs. interacting with a phone in a mount); quantify a device usage (e.g., duration, severity, etc.); determine a risk score for a user associated with the riskiness of their driving; produce an output based on the device usage and/or risk score (e.g., report to an insurance company, limit device usage, provide awareness to the user, etc.), and/or perform any other suitable function.

The method 100 is preferably performed with a system as described above, but can additionally or alternatively be performed with any other suitable system.

4.1 Method: Receiving User Device Information S110

The method 100 includes receiving user device information S110, which functions to receive information with which to determine a device usage associated with a mobile device by the user. Additionally or alternatively, S110 can function to eliminate data to be used when determining a device usage (e.g., to reduce false positives, to remove noise, etc.) and/or perform any other suitable function(s).

The user device information, equivalently referred to herein as user device data, is preferably generated and/or sampled at the user device, such as at any or all of: one or more sensors of the sensor system, at a processing system (e.g., CPU) of the user device, at a computing system of the user device, at a client application executing on the user device, at an SDK associated with a client application, and/or at any other suitable component(s) of the user device. Information received from a user device is preferably received from a single user device, but can additionally or alternatively be received from multiple user devices.

Additionally or alternatively, information can be received from any or all of: an external sensor system; a vehicle (e.g., speedometer); a data storage source; a remote computing system; and/or any other suitable data source.

The information is preferably received at a user device (e.g., the same user device as where it's generated, a separate user device, etc.), further preferably at a client application (e.g., primary client application, secondary client application, etc.) executing on the user device, but can additionally or alternatively be received at any or all of: a processing system of the user device, a computing system of the user device, an SDK associated with the client application, and/or at any other suitable component or module of the user device. Further additionally or alternatively, information can be received at a remote computing system and/or any other suitable component(s).

The information collected in S110 (and/or supplementary datasets) is preferably sampled by components arranged at a mobile device, but can additionally or alternatively be sampled by components associated with (e.g., arranged at, positioned within, mounted to, physically connected to, etc.) any suitable device and/or vehicle. The user device information (and/or supplementary datasets) is preferably associated with one or more users (e.g., collected at a mobile device of the user; collected at a mobile device physically proximal a user; stored in association with user accounts for one or more users; movement datasets describing user movement, such as pre-, during, and/or post-driving session; etc.). Further, the user device information is preferably associated with one or more driving sessions, which can be characterized by characteristics and/or patterns in movement data (e.g., movement data indicating movement that is characteristic of a vehicle) and/or supplementary data (e.g., engine sounds as sensed by a smartphone microphone), and where driving sessions can include movement of, stoppage of, operation control related to, and/or other suitable aspects associated with vehicles. Additionally or alternatively, the user device information can be associated or independent of any suitable entities.

Any or all of the information in S110 can be collected continuously from and/or at mobile devices in a vehicle (e.g., during vehicle operation), such as in real-time, but can additionally or alternatively include collecting information periodically (e.g., at vehicle stoppage events, at predetermined time intervals such as every minute, etc.), and/or in temporal relation (e.g., in response to, etc.) to trigger conditions (e.g., movement-related thresholds; satisfaction or failure of device association conditions; detection of user's interaction with the user device; conditions associated with supplementary data; etc.), but collecting information can be performed at any suitable time and/or frequency. Any or all of the information can be associated with one or more temporal indicators (e.g., a time period, a time point, etc.) describing when the information was collected (e.g., sampled at the corresponding sensor, etc.), determined, and/or otherwise processed. Additionally or alternatively, associated temporal indicators can describe temporal context surrounding the information but can further additionally or alternatively correspond to any suitable temporal indicator or be time-independent. However, collecting information can be performed in any suitable manner.

S110 can be performed by any or all of: an application (e.g., a native application executing in the background, a client, etc.); the operating system of the mobile device (e.g., iOS™, Android™); a remote computing system associated with the operating system; or by any suitable system. In variants where S110 is performed by the operating system or remote system associated with the operating system, the method can reduce additional resource consumption (e.g., battery consumption) because the underlying data is being collected and used for other processes; the application itself is minimizing or not consuming any additional resources. In one variation, S110 includes setting a wake condition with the mobile device operating system, wherein the mobile device operating system delivers an event (e.g., notification) to the application, launches the application, progresses to S120, or otherwise triggers further application operation in response to the condition being met.

The user device information preferably includes movement information (equivalently referred to herein as motion information), which is preferably associated with motion of the user device (e.g., with respect to the vehicle), but can additionally or alternatively be associated with the vehicle (e.g., speed of vehicle), the user, and/or any other suitable component(s).

The movement information can include any or all of: movement data (e.g., position data; velocity data; acceleration data; a position, velocity, acceleration (PVA) dataset; a motion dataset, motion data, movement data, etc.); orientation data (e.g., orientation of the user device, change in orientation direction at which a screen of the user device is facing, gravity deviation, rate of gravity deviation, rate of gravity deviation around a projected centroid, etc.); and/or any other suitable information.

The movement information is preferably sampled at one or more movement sensors indicative of motion and/or orientation, such as any or all of: multi-axis accelerometers, single-axis accelerometers, gyroscopes, and/or any other motion or orientation sensors (e.g., virtual sensor utilizing accelerometer and gyroscope data; virtual sensor utilizing accelerometer, gyroscope, and magnetometer data; etc.). Additionally or alternatively, motion information and/or any other information collected in S110 can be collected from and/or derived from any or all of: location sensors (e.g., GPS data collection components, magnetometer, compass, altimeter, etc.), optical sensors, audio sensors, electromagnetic (EM)-related sensors (e.g., radar, lidar, sonar, ultrasound, infrared radiation, magnetic positioning, etc.), environmental sensors (e.g., temperature sensors, altitude sensors, pressure sensors, etc.), biometric sensors, and/or any other suitable sensors.

In some variations, the motion information includes acceleration data collected from an accelerometer of the user device and orientation data (e.g., rate of gravity deviation) collected from a gyroscope and/or an orientation sensor (e.g., virtual sensor) of the user device. The motion information is preferably collected continuously while the user is driving (e.g., as detected by the accelerometer, as detected by a GPS application, etc.), but can additionally or alternatively be collected in response to another trigger, collected intermittently, and/or otherwise collected.

Further additionally or alternatively, S110 can be performed in absence of collecting motion information.

The user device information further preferably includes system performance information, which functions to determine whether or not the user is engaging with the user device. The system performance information can additionally or alternatively function to determine if one or more secondary client applications are being used, determine which client applications are being used, quantify (e.g., in duration of time, number of interactions, etc.) the user's engagement with the user device, and/or perform any other suitable function.

The system performance information preferably includes processing information associated with the user device, such as activity information collected at the CPU of the user device, which can be associated with any or all of: network transfer activities, downloading activities, and/or any other suitable activities associated with one or more processing systems of the user device.

The system performance information can additionally or alternatively include any other suitable information associated with the user device, such as an amount of free memory.

In some variations, the system performance information enables a primary client application to detect that a user is interacting with a secondary client application, despite not having direct access to the information being collected at the secondary client application. In specific examples, this is enabled by collecting CPU activity information, network transfer information, and an amount of free memory (e.g., which can be compared with a previous value to determine and/or predict a user's activity of the device) associated with the user device.

Additionally or alternatively, any other suitable information can be collected and/or S110 can be performed in absence of collecting system performance information.

The device information further preferably includes device handling information, which functions to determine if and how the user is physically interacting with (e.g., holding in hand for texting, holding close to ear for calling, etc.) the user device. Collecting device handling information can additionally or alternatively function to determine if the phone is not being held by the user (e.g., is held in a mount, is otherwise coupled to an interior of the vehicle, is resting on a seat of the vehicle, etc.), determine a degree to which the user is interacting with the user device, determine and/or predict an activity (e.g., texting, calling, viewing a map and minimally interacting, etc.) associated with the interaction, and/or perform any other suitable function(s).

The handling information preferably includes proximity and/or contact information, which can be collected at any or all of: proximity sensors (e.g., infrared sensors), optical sensors (e.g., light sensor, ambient light sensors, etc.), contact sensors (e.g., electrical conductance sensor), heat sensors, and/or any other suitable sensors configured to determine if the user device is proximal to the user (e.g., touching, proximal, proximal to the user's face, etc.). The handling information is preferably collected by one or more sensors onboard the user device (e.g., a proximity sensor proximal to a speaker of the user device, an ambient light sensor proximal to a speaker of the user device, etc.), but can additionally or alternatively be collected at any other suitable sensors onboard or external to the user device.

Data from the proximity sensor preferably includes return signals and/or a return field resulting from the emission of an electromagnetic field and/or a beam of electromagnetic radiation (e.g., infrared radiation). This can be used for instance, to determine if the user device is being held to the user's ear (e.g., non-stationary and proximity sensor indicates user is close, during a phone call, etc.) versus being held in a user's hand (e.g., non-stationary and proximity sensor does not indicate that a user is close, while texting, etc.). Data from another sensor, such as an optical sensor (e.g., ambient light sensor), can additionally or alternatively be used (e.g., to provide a higher confidence determination of how the user is interacting with the phone, to detect a user speaking on speaker phone and holding the phone backward, to distinguish between a user holding the phone and the phone resting face down on a seat, etc.). The second sensor can function, for instance, to distinguish between different types of handling of the user device by the user. Additionally or alternatively, any other suitable sensors can be used.

The sensors can be arranged proximal to each other (e.g., on the same surface of the user device), on different surfaces of the user device (e.g., to accurately characterize a user's handling of the phone, etc.), all onboard the user device, all offboard the user device, and/or any combination of these.

In some variations, the handling information is collected at a proximity sensor arranged onboard the user device (e.g., proximal to a speaker, proximal to a screen, etc.) and at an ambient light sensor arranged onboard the user device (e.g., proximal to a speaker, proximal to a screen, etc.), which are collectively used to determine and/or predict how the user is handling a non-stationary phone (e.g., holding up to ear, holding in hand, etc.).

Additionally or alternatively, any other suitable information can be collected and/or S110 can be performed in absence of collecting handling information.

The method 100 can additionally include collecting location information S112, which functions to determine one or more characteristics of the vehicle. The location information can additionally or alternatively function to characterize and/or eliminate user device information based on one or more parameters (e.g., speed) associated with the vehicle, and/or perform any other suitable function.

S112 can include collecting one or more location datasets (e.g., collecting location data), which can include any one or more of: GPS data (e.g., position coordinates, associated time stamps, etc.), indoor positioning system data, local positioning system data, multilateration data, GSM localization data, self-reported positioning, control plane locating data, compass data, magnetometer data, and/or any other suitable location-related data. In an example, GPS data can be leveraged for complete PVA solutions, but can additionally or alternatively include any movement data, such as retrieved using GNSS data (e.g., via GLONASS, Galileo, BeiDou). In another example, proximity sensors associated with mobile phones (e.g., for capacitive proximity sensing; IR-based proximity sensing; etc.) can be used to in determining location of objects (e.g., users within a vehicle). In another example, S112 can include collecting a microlocation dataset (e.g., sampled using beacons within and/or mounted to a vehicle). In another example, S112 can include collecting a location dataset sampled by a mobile device and indicating the location of the mobile device within the vehicle (e.g., proximal front of vehicle; back of vehicle; etc.). However, collecting location datasets can be performed in any suitable manner.

In some variations, S112 includes continuously collecting location data of the vehicle, which can be used to determine any or all of: a speed of the vehicle, a road being traveled by the vehicle, one or more turns of the vehicle, and/or any other suitable information.

In one variation, S110 includes continuously collecting (e.g., while the user device is in a vehicle, while the user device is in a vehicle as determined by location information, etc.) motion information (e.g., from an accelerometer, from a gyroscope, from an orientation sensor, etc.) associated with the user device, performance information (e.g., processing activity, CPU activity, network transfer information, amount of free memory, etc.) associated with the user device, and optionally handling information (e.g., from a proximity sensor, from an optical sensor, etc.) associated with the user device, which is used to assess a user's interaction with the user device in subsequent processes of the method. Additionally, location information can be collected and used to determine one or more parameters of the vehicle (e.g., speed, location in space, etc.), which can also be used in subsequent processes of the method (e.g., to eliminate data, to appropriately determine a risk score, etc.).

Additionally or alternatively, any other suitable information can be collected in S110.

4.2 Method: Based on the User Device Information, Determining a State of the User Device S120

The method 100 includes determining a state of the user device S120, which functions to classify whether or not the user device is stationary with respect to the vehicle. Additionally or alternatively, S210 can function to determine any other characterization of the user device, such as any or all of: the user device is being handled (e.g., held, moved around, etc.) by the user, the user device is coupled to the vehicle such as in a mount, and/or any other suitable characterization.

The state preferably indicates whether or not the user device is stationary (e.g., with respect to the vehicle) based on a stationary metric, which is preferably determined, at least in part, based on any or all of the motion information (e.g., acceleration information, gyroscope information, orientation information, etc.) described above. Additionally, the state can be determined based on any or all of the other information described above (e.g., performance information, handling information, location information, etc.), as well as any other supplementary data (e.g., environmental data). The stationary metric can include a binary indication of whether or not the device is stationary; a classification of the state as any or all of: stationary, non-stationary, in transition between stationary and non-stationary; a parameter along a spectrum of how stationary the device is; and/or any other suitable metric(s). The stationary metric can be determined based on any or all of: one or more algorithms, a deep learning model, comparison with a threshold, and/or determined in any other suitable way.

The state of the user device preferably serves as a trigger for one or more sub-processes of S130 (e.g., determining whether phone is handled by a user or in a mount, etc.), but can additionally or alternatively be used in any suitable way(s) throughout the method 100.

The state of the device can be determined for each of a set of sections of data, equivalently referred to herein as segments of data, wherein the sections of data are separated by a transition (e.g., a motion threshold, a performance threshold, a device handling threshold, etc.), and/or any other suitable information.

In one variation, S120 includes classifying, based on any or all of the information collected in S110 and an algorithm (e.g., of a machine learning model), a classification of at least whether the device is in a stationary state or a non-stationary state, which functions to trigger one or more actions in S130.

4.3 Method: Based on the State of the User Device, Determining a Set of Tap Parameters and/or a Device Classification S130

The method 100 includes based on the state of the user device, determining a set of tap parameters and/or a device classification S130, which functions to determine (e.g., quantify, assess, etc.) a user's (e.g., driver's) interaction with the user device.

Taps herein refer to any actions or gestures associated with a user's interaction with a user device, further preferably with a touch-sensitive surface of the user device, such as, but not limited to: a tap or touch, a swiping motion, a pinching motion, a zooming motion (e.g., zooming in, zooming out, etc.), a typing action, and/or any other suitable interaction. Additionally or alternatively, taps can refer to interactions with other components of the user device, such as a pressing of a button (e.g., power, volume, etc.), a user of one or more sensors (e.g., an audio sensor to provide a command, etc.), and/or any other suitable interactions.

The tap parameters can include and/or be determined based on any or all of: a number of taps, a frequency of taps, a duration of taps, a time in between taps, a set of taps (e.g., closely-spaced taps), a tap region (e.g., an aggregated set of taps), a tap event (e.g., which remains after comparisons with a predetermined set of thresholds), and/or any other suitable parameters.

In an event that the device is in a stationary state (e.g., during a section of data collected in S110), S120 preferably includes determining a first set of tap parameters S132.

Determining that the user device is in a stationary state preferably triggers a second state to be determined, which determines whether or not the user device is in a mount. The second state can be determined based on any or all of: an algorithm, a deep learning model, comparison with a threshold, sensor data (e.g., visual data from a camera, etc.), any of the information collected in S110, knowing the location of the user device within the vehicle (e.g., consistently at the front of the vehicle, on a dashboard, etc.) and/or any other suitable information.

In an event that it is determined that the user device is in a mount, S132 preferably includes determining (e.g., computing) a set of tap parameters, wherein the set of tap parameters are determined, at least in part based on motion information collected in S110, such as data collected from any or all of: an accelerometer, a gyroscope, and an orientation sensor. Additionally or alternatively, the set of tap parameters can be based on any other suitable sensor information and/or any other information.

The set of tap parameters preferably includes a set of tap regions, which can be determined based on any or all of the following processes. Additionally or alternatively, the set of tap parameters can include any or all of the intermediate parameters described below, any or all of the parameters described in S134, and/or any other suitable parameters.

In preferred variation, the set of tap parameters is determined based on a gravity deviation parameter, which can reflect a user's interaction with (e.g., perturbation of) the user device (e.g., tapping the screen, asymmetrically tapping the screen, causing perturbations to the phone while it is mounted, etc.) while the device is mounted. The gravity deviation parameter is preferably calculated about a projected centroid (e.g., medoid) of the user device, but can additionally or alternatively be calculated about any suitable region, point, axis, plane, or other feature (physical or virtual) of the user device. In specific examples, the gravity deviation parameter includes a rate of gravity deviation. Additionally or alternatively, any other gravity deviation parameter can be calculated and/or any other suitable parameter can be calculated.

S132 can optionally include classifying at least a subset of the gravity parameters as potential tap events, which functions to eliminate tap events which are likely not associated with any or all of: the user interacting with the user device (e.g., and instead noise), the user being distracted by his interaction with the user device (e.g., for brief or rare taps), and/or can perform any other suitable function. In some variations, a predetermined percentage (e.g., 10%, less than 10%, greater than 10%, between 2% and 25%, etc.) of highest-value (e.g., greatest rate of gravity deviation) tap parameters are classified as potential tap events. The predetermined percentage can be determined. Additionally or alternatively, tap parameters which exceed a predetermined threshold (e.g., minimum rate of gravity deviation threshold) can be classified as potential tap events, a set of random tap parameters can be classified as potential tap events, all random tap parameters can be classified as potential tap events, and/or potential tap events can be determined in any other suitable way(s).

S132 can optionally include aggregating the set of potential tap events into tap regions, which functions to take into account one or more temporal parameters (e.g., duration of tap event, duration of a set of tap events, time between subsequent tap events, etc.) associated with the user's interaction with the user device. Additionally, this can function to eliminate events not associated with a user interaction (e.g., a false positive), not significant in causing user distraction, and/or any other suitable events. The temporal parameter preferably includes a time between adjacent tap events, which is compared with a maximum time threshold (e.g., 10 seconds, less than 10 seconds, greater than 10 seconds, etc.), wherein potential tap events which have a time spacing below the time threshold are aggregated into a tap region. Additionally or alternatively, a deep learning model and/or algorithm can be used to determine a tap region, a minimum threshold can be used to determine a tap region, a set of multiple thresholds can be used, and/or any other suitable parameters can be used to determine a tap region. Further additionally or alternatively, S132 can be performed in absence of aggregating potential tap events into a tap region. In some variations, a set of potential tap events which have a time between events within 10 seconds form a tap region.

S132 can optionally include discarding one or more tap regions based on a predetermined threshold, such as a temporal threshold (e.g., duration of tap region, number of potential tap events in the tap region, etc.). In some variations, S132 includes discarding tap regions (e.g., removing from further consideration) having a duration (e.g., from the beginning of the first potential tap event to the end of the last potential tap event) of less than a minimum threshold (e.g., 3 seconds, less than 3 seconds, greater than 3 seconds, etc.).

S132 can optionally include analyzing the tap regions, which functions to determine one or more features associated with the tap region. These features can be used to eliminate tap regions from further consideration, rank a riskiness of tap regions, and/or perform any other suitable function. The tap regions are preferably analyzed with respect to system performance information, further preferably with respect to processing activity (e.g., CPU usage) of the user device associated with the tap region. This can function, for instance, to further narrow in the tap regions which are most likely associated with user interaction with the user device. In preferred variations, for instance, S132 includes analyzing each of the set of tap regions for an associated CPU usage occurring contemporaneously (e.g., at the same time, substantially at the same time, etc.) with the tap region, wherein tap regions associated with a CPU usage below one or more predetermined thresholds are discarded (e.g., removed, eliminated from further consideration, etc.). In specific examples, a CPU curve (e.g., scaled, normalized, smoothed, scaled and smoothed, etc.) associated with each tap region is analyzed, and if the CPU curve has a predetermined number of points (e.g., 2, 1, greater than 2, etc.) above a predetermined threshold value (e.g., 0.75, 0.5, less than 0.75, greater than 0.75, etc.), it moves forward to further processing; otherwise it is discarded. Additionally or alternatively, one or more thresholds can be dynamically determined (e.g., based on the collective set of CPU curves associated with the tap region), a different number of thresholds can be implemented, an algorithm and/or a deep learning model can be implemented, and/or the tap regions can be otherwise analyzed and/or processed.

S132 can optionally include discarding and/or chopping one or more tap regions based on a vehicle parameter (e.g., as determined based on information collected in S110, as determined based on location information, etc.), such as a vehicle speed, which can function to discard tap regions associated with low vehicle speeds (e.g., less risky behavior) and/or no speed. In some variations, for instance, S132 includes discarding and/or chopping (e.g., reducing a duration of) tap regions associated with a vehicle speed below a predetermined threshold (e.g., 5 meters per second, less than 5 meters per second, greater than 5 meters per second, 11 miles per hour, less than 11 miles per hour, greater than 11 miles per hour, etc.). Additionally or alternatively, the tap regions can be otherwise analyzed.

In an event that the device is not in a stationary state and is rather in a mobile state, S120 preferably includes determining a classification of the user device S134, wherein the classification is determined, at least in part, based on movement information (e.g., orientation information, motion information, etc.) collected in S110, such as data collected from any or all of: an accelerometer, a gyroscope, and an orientation sensor. Additionally or alternatively, the classification can be based on any other suitable sensor information and/or any other information. Further additionally or alternatively, S134 can include determining a second set of tap parameters (e.g., similar to those determined in S132, identical to those determined in S132, differently from those determined in S132, based on movement data, based on processing activity data, etc.), and/or any other suitable parameters. The second set of tap parameters can include a set of tap sections, which can be determined based on any or all of the following processes. Additionally or alternatively, the second set of tap parameters can include any or all of the intermediate parameters described below, any or all of the parameters described in S132, and/or any other suitable parameters.

S134 preferably includes splitting any or all of the user interaction data (e.g., any or all of the data collected in S110) into sections based on a set of transitions, wherein the set of transitions preferably separate stationary events from mobile events (e.g., based on motion information), but can additionally or alternatively separate different types or severities (e.g., in terms of risk) of mobile events, and/or otherwise determine subsections of data. Further additionally or alternatively, S134 can be performed based on a collective set of sections.

Figure 4A:
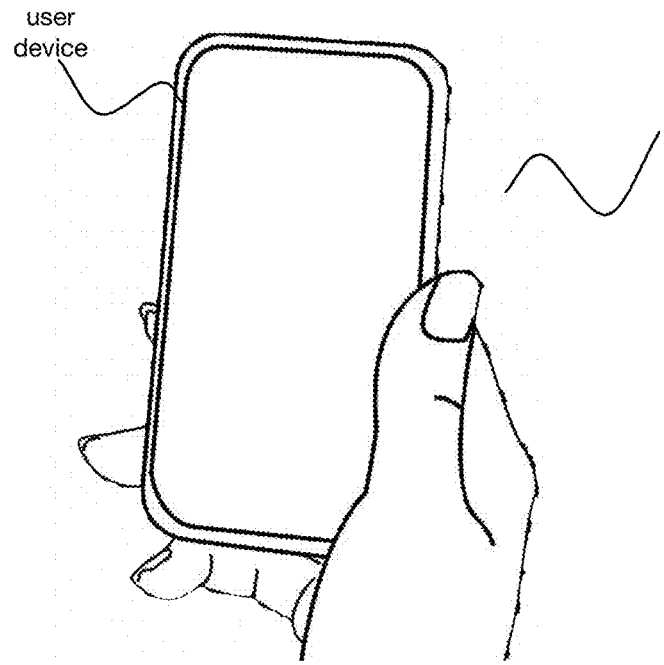
FIGS. 4A-4C depict a variation of different types of device usage.
Figure 4B:
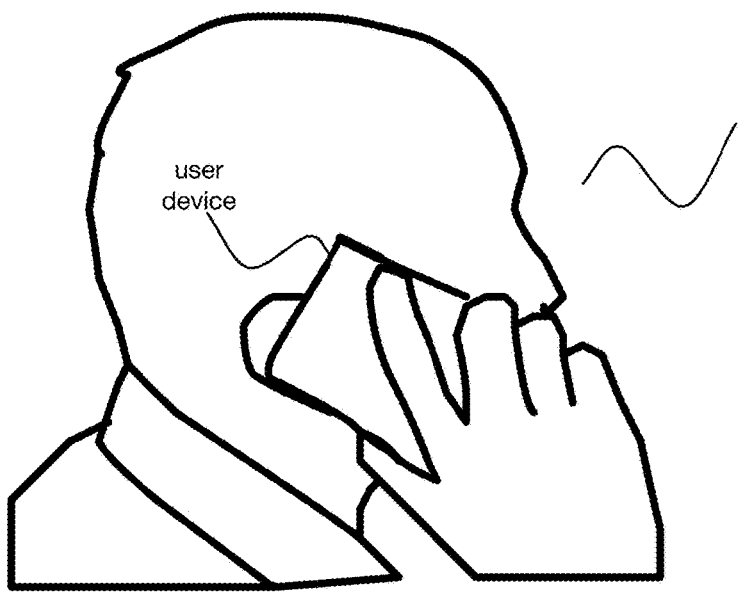
Figure 4C:
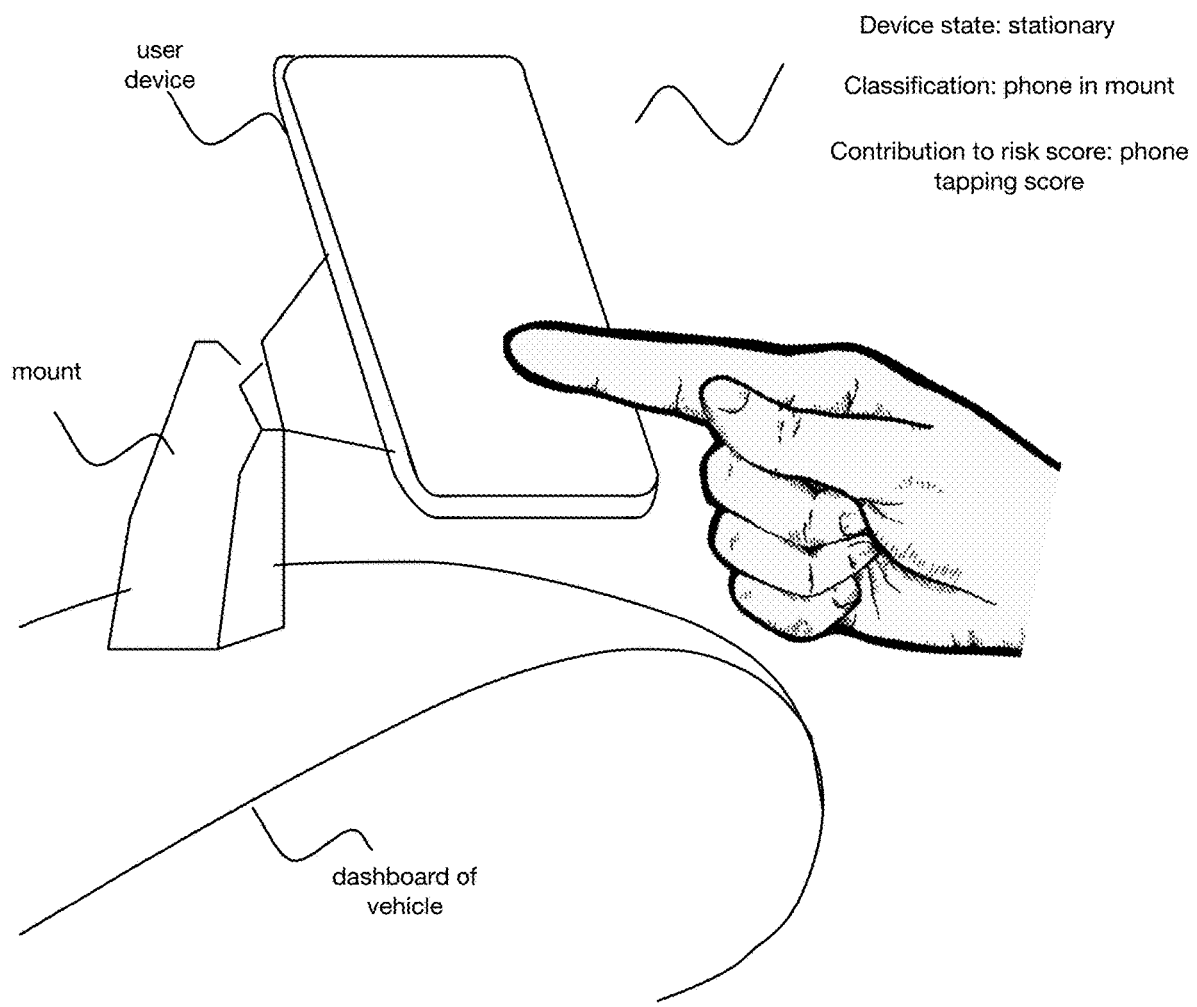

S134 further preferably includes classifying each section of user interaction data, which can function to determine and/or approximate how the user is interacting with the user device (e.g., as shown in FIGS. 4A-4C). The sections are preferably determined, at least in part, based on orientation information (e.g., from a gyroscope of the user device, from an orientation sensor of the user device, from an accelerometer of the user device) associated with the user device, wherein the orientation information can be used to determine and/or approximate if the user is engaging in a phone call; if the user is interacting with a screen of the user device (e.g., reading, texting, interacting with a client application, providing inputs to a client application, receiving outputs from a client application, etc.); and/or any other suitable classification (e.g., unknown interaction, no interaction, etc.). In some variations, for instance, an orientation corresponding to the screen facing upward or nearly upward corresponds to a user interacting with the screen of the user device. An orientation corresponding to a screen facing to the side or substantially to the side (e.g., against a user's ear) can correspond to a user making a phone call. Additionally or alternatively, the orientation information can be otherwise used in producing any or all of the classifications.

Additionally or alternatively, any or all of the proximity information can be used in classifying each section of user interaction data. In some variations, for instance, the proximity information can indicate whether a user device is being held against the user (e.g., against the user's ear), or if the user device is not arranged proximal to the user (e.g., being held in a user's hand with the screen facing up, not being held by the user, etc.).

Further additionally or alternatively, any other information (e.g., collected in S110, outside of S110, etc.) can be used.

S134 can optionally further include reporting and/or recording (e.g., tallying, saving, etc.) one or more sections based on the classification. In some variations, sections having a classification indicating that the user is interacting with a screen of the user device (e.g., reading) carry on to further processes of the method, such as determining a risk score in S140. Prior to this, any or all of the classifications can optionally be assessed to predict whether or not the user is actively engaging with the user device during the section (e.g., based on motion data, based on CPU data, etc.). In examples, CPU activity must meet a minimum threshold (e.g., as described above) in order to be marked as active. Additionally or alternatively, the classifications can be otherwise analyzed or not analyzed.

The sections can further optionally be analyzed in relation to a parameter of the vehicle (e.g., speed, as described in S132, etc.), such as prior to being reported or recorded. Additionally or alternatively, S134 can be performed in absence of determining a vehicle parameter and analyzing the sections in light of it.

Additionally or alternatively, the set of tap parameters can be determined in the same way in S132 and S134, and/or be determined in any other suitable way(s).

S130 is preferably performed multiples times throughout the method 100, such as throughout the duration of a trip, wherein one of S132 and S134 is being implemented at any time point that the user is driving. Additionally or alternatively, S130 can be performed once, intermittently, in response to a trigger, and/or at any other suitable times.

In one variation, S130 includes in response to detecting that the device is in a stationary state: determining a set of tap events occurring in a set of data (e.g., data stream) corresponding to the stationary state, wherein the set of data can include any or all of the information collected in S110; determining a set of tap regions based on the set of tap events, wherein determining the set of tap regions includes comparing each of the set of tap events with a maximum temporal spacing threshold (e.g., 10 seconds) and aggregating tap events with a temporal spacing less than the threshold into a tap region; determining a duration of the tap region; eliminating tap regions from further processing which have a duration less than a predetermined threshold (e.g., 3 seconds); optionally determining a processing activity associated with the tap region (e.g., a normalized CPU curve) and moving tap regions to further processing which have a processing parameter above a predetermined threshold (e.g., at least a predetermined number of points above a predetermined threshold value); determining a parameter associated with the vehicle (e.g., speed); and eliminating tap regions from further processing which are associated with a vehicle parameter below a predetermined threshold (e.g., 11 mph). Additionally or alternatively S132 can include any other suitable processes.

In a specific example of the first variation, determining the set of tap events includes determining a set of rates of gravity deviation and determining a subset (e.g., top 10%) of the rates of gravity deviation having the highest value; aggregating the subset of tap events into tap regions which have a spacing of less than or equal to 10 seconds between adjacent tap events; discarding tap regions from further processing which have a duration of less than 3 seconds; discarding tap regions from further processing which are associated with a CPU activity below a predetermined threshold; and discarding tap regions from further processing which are associated with (e.g., occurring contemporaneously) with a vehicle speed less than or equal to 11 miles per hour.

In a second variation, additional or alternative to the first variation, S130 includes in response to detecting that the device is in a non-stationary state: splitting data (e.g., data stream), wherein the set of data can include any or all of the information collected in S11, corresponding to the non-stationary state into a set of sections based on a set of transitions (e.g., motion transitions, orientation transitions, etc.) occurring in the data; classifying each section (e.g., as a call, as a user interacting with/touching a screen of the user device, as unknown, as shown in FIGS. 4A-4C, etc.) based on orientation information associated with the user device; and optionally reporting and/or otherwise marking classifications associated with the riskiest behavior (e.g., user interacting with/touching a screen). Additionally, S134 can include discarding sections associated with a vehicle parameter outside of a set of threshold (e.g., below a predetermined speed threshold), and/or otherwise analyzing the data.

4.4 Method: Determining a Risk Score Based on the Set of Tap Parameters S140

The method 100 can optionally include determining a risk score based on the set of tap parameters S140, which functions to quantify the riskiness of the user's interactions with his or her user device.

The risk score is preferably determined based on a phone tapping risk score, which is determined based on the percentage of a trip in which the user was tapping on the user device. The risk score can additionally or alternatively be determined based on a phone handling risk score, which is determined based on the percentage of a trip the user was handling the user device. The events corresponding to the user handling the user device preferably includes the duration in time in which the device is mobile. Additionally or alternatively, the handling events can include events wherein the user device is mobile but the user is not interacting with the screen (e.g., when the user is on a call, when the user is not on a call and not interacting with the screen, when the user is holding the user device, etc.), but can additionally or alternatively include any other suitable events.

In variations wherein the risk score takes into account both the phone tapping and phone handling scores, the phone tapping scores and phone handling scores (e.g., all events wherein the user device is mobile) can be directly added together without taking into account overlapping events. This can function to signify that a user device handling event and a phone tapping event occurring simultaneously is as risky or nearly as risky as them occurring separately. Additionally or alternatively, overlapping events can be taken into account, the risk scores can be weighted prior to combining, a deep learning model and/or one or more algorithms can be used to determine the risk score, and/or the risk score can be otherwise determined.

The risk score can be determined on a per trip basis (e.g., based on vehicle location data, based on vehicle motion data, etc.), aggregated over multiple trips, and/or be otherwise determined and/or associated with at least a portion of a trip and/or multiple trips.

Additionally or alternatively, any or all of the methods, processes, and embodiments described in U.S. application Ser. No. 15/835,284, filed 7 Dec. 2017, which is incorporated herein in its entirety by this reference can be implemented in S140.

4.5 Method: Determining an Output Based on the Risk Score S150

The method 100 can optionally include determining an output based on the risk score S150, which can function to update a driver assessment, produce an actionable output, and/or perform any other suitable function.

The output can optionally include determining and/or updating a report, such as a report sent to any or all of: an insurance company (e.g., in an event that an accident occurs, to reward a user for safe driving, to determine a user's insurance cost, etc.), the user (e.g., to facilitate safe driving, to alert the user to potentially risky behavior, etc.), a supervisory agency (e.g., a probation officer), another user (e.g., a family member, a passenger, etc.), and/or any other suitable user. Additionally or alternatively, the output can include any or all of: updating a user profile (e.g., at the primary client application), updating an aggregated risk score (e.g., associated with the user profile), transmitting a notification (e.g., to any of the individuals described above, in response to the risk score exceeding a predetermined threshold, etc.), restricting access to any or all of user device, and/or producing any suitable output.

The method 100 can optionally further include, at any time during the method 100, classifying (e.g., verifying) a user as the driver, or alternatively a passenger. This is preferably performed based on any or all of the methods, processes, and embodiments described in U.S. application Ser. No. 16/022,120, filed 28 Jun. 2018, which is incorporated herein in its entirety by this reference, but can additionally or alternatively be determined in any other suitable way.

Embodiments of the system and/or method can include every combination and permutation of the various system components and the various method processes, wherein one or more instances of the method and/or processes described herein can be performed asynchronously (e.g., sequentially), concurrently (e.g., in parallel), or in any other suitable order by and/or using one or more instances of the systems, elements, and/or entities described herein.

4.6 Method: Variations

Figure 5:
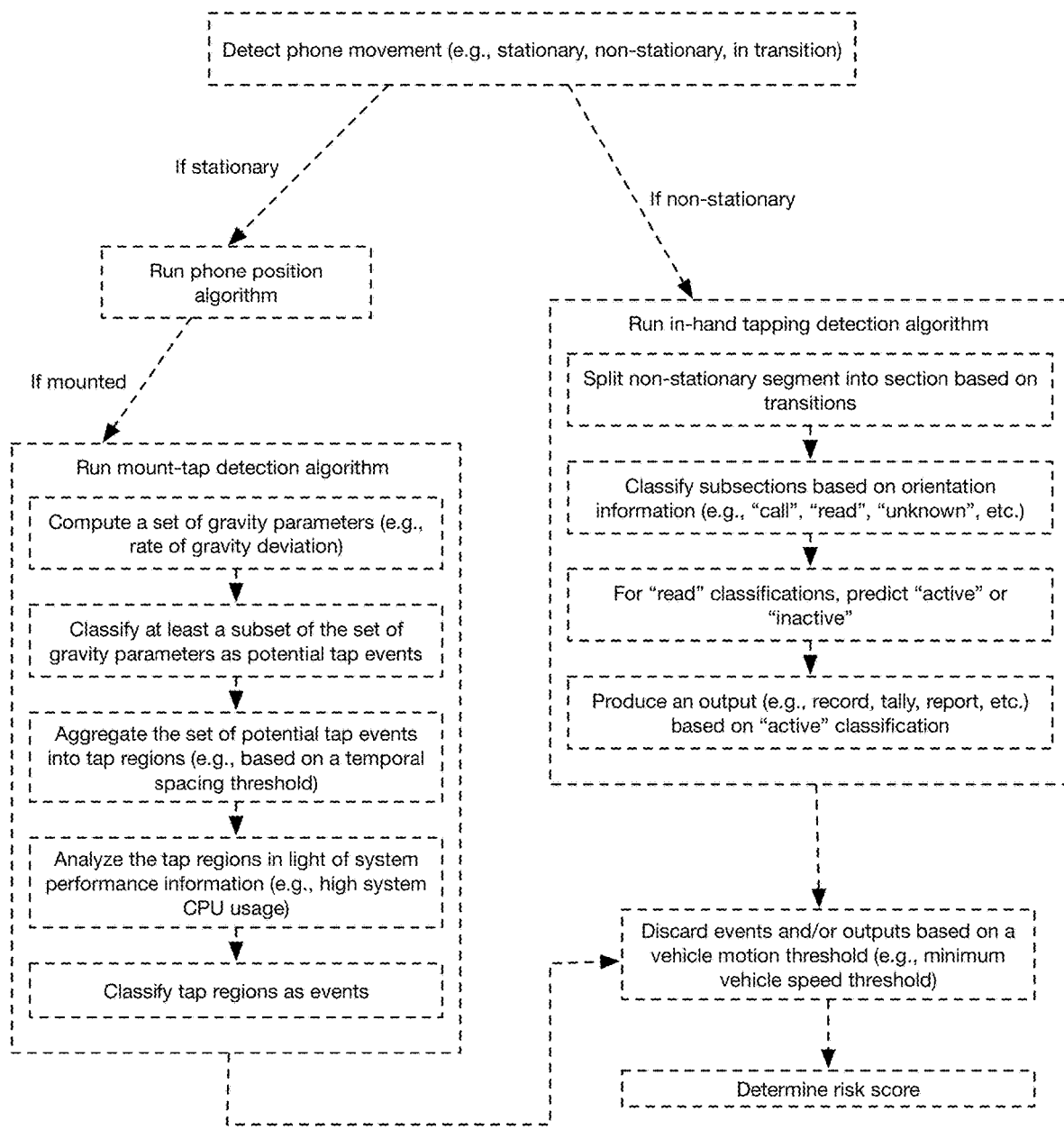
FIG. 5 depicts a variation of a method 100 for assessing device usage.

In a first variation of the method 100 (e.g., as shown in FIG. 5), the method 100 includes any or all of: continuously collecting (e.g., while the user device is in a vehicle, while the user device is in a vehicle as determined by location information, etc.) motion information (e.g., from an accelerometer, from a gyroscope, from an orientation sensor, etc.) associated with the user device, performance information (e.g., processing activity, CPU activity, network transfer information, amount of free memory, etc.) associated with the user device, and optionally handling information (e.g., from a proximity sensor, from an optical sensor, etc.) associated with the user device, which is used to assess a user's interaction with the user device in subsequent processes of the method; collecting location information to determine one or more parameters of the vehicle (e.g., speed, location in space, etc.), which can be used in subsequent processes of the method (e.g., to eliminate data, to appropriately determine a risk score, etc.); classifying, based on any or all of the information collected in S110 and an algorithm (e.g., of a machine learning model, a phone movement algorithm, etc.), a classification of at least whether the device is in a stationary state or a non-stationary state, which functions to trigger one or more actions in S130; in an event that the device is in a stationary state: determining a set of tap events occurring in a set of data (e.g., data stream) corresponding to the stationary state, wherein the set of data can include any or all of the information collected in S110; determining a set of tap regions based on the set of tap events, wherein determining the set of tap regions includes comparing each of the set of tap events with a maximum temporal spacing threshold (e.g., 10 seconds) and aggregating tap events with a temporal spacing less than the threshold into a tap region; determining a duration of the tap region; eliminating tap regions from further processing which have a duration less than a predetermined threshold (e.g., 3 seconds); optionally determining a processing activity associated with the tap region (e.g., a normalized CPU curve) and moving tap regions to further processing which have a processing parameter above a predetermined threshold (e.g., at least a predetermined number of points above a predetermined threshold value); determining a parameter associated with the vehicle (e.g., speed); and eliminating tap regions from further processing which are associated with a vehicle parameter below a predetermined threshold (e.g., 11 mph). Additionally or alternatively S132 can include any other suitable processes; in an event that the device is in a non-stationary state: splitting data (e.g., data stream), wherein the set of data can include any or all of the information collected in S11, corresponding to the non-stationary state into a set of sections based on a set of transitions (e.g., motion transitions, orientation transitions, etc.) occurring in the data; classifying each section (e.g., as a call, as a user interacting with/touching a screen of the user device, as unknown, etc.) based on orientation information associated with the user device; and optionally reporting and/or otherwise marking classifications associated with the riskiest behavior (e.g., user interacting with/touching a screen). Additionally, S134 can include discarding sections associated with a vehicle parameter outside of a set of threshold (e.g., below a predetermined speed threshold), and/or otherwise analyzing the data; determining a phone tapping score based on one or both of S132 and S134; determining a phone handling score based on S132; determining a risk score by combining (e.g., directly adding, adding in a weighted fashion, combining according to an algorithm, etc.) the phone tapping score and the phone handling score; and optionally determining an output (e.g., updating a user profile, updating an insurance model/report, etc.) based on the risk score.

Additionally or alternatively, the method 100 can include any other suitable processes performed in any suitable combination.

As a person skilled in the art will recognize from the previous detailed description and from the figures and claims, modifications and changes can be made to the preferred embodiments of the invention without departing from the scope of this invention defined in the following claims.

We claim:

1. A method for assessing usage of a user device by a driver while driving a vehicle, the method comprising:
    collecting a dataset from the user device;
    based on the dataset, determining a state of a set of states of the user device, wherein the set of states comprises:
        a stationary state of the user device relative to the vehicles, and
        a non-stationary state of the user device relative to the vehicle;
    based on the state being the non-stationary state, determining a classification of a set of classifications of the user device, wherein the set of classifications comprises one or more classifications related to whether the driver is engaged in a phone call;
    based on the classification, determining a handling score associated with the user device in the non-stationary state, the handling score indicating a type of handling of the user device among a plurality of types of handling of the user device;
    determining a risk score for the driver based on the handling score; and
    producing an output based on the risk score.

2. The method of claim 1, wherein the set of classifications comprises a reading classification.

3. The method of claim 1, wherein the handling score is determined based on at least a first classification corresponding to the driver being engaged in the phone call and at least a second classification corresponding to the driver interacting with the user device in a way different than being engaged in the phone call.

4. The method of claim 3, wherein the second classification comprises a reading classification.

5. The method of claim 1, further comprising determining a screen tapping score associated with the driver interacting with a screen of the user device in the stationary state, wherein the screen tapping score is determined separately from the handling score, and wherein the risk score is further determined based on the screen tapping score.

6. The method of claim 5, wherein the screen tapping score is further associated with the driver interacting with the screen of the user device while the user device is arranged in a mount.

7. The method of claim 5, wherein determining the screen tapping score comprises detecting a set of taps on the screen, the set of taps detected based on motion information collected from at least one of the following sensors arranged onboard the user device: an accelerometer, a gyroscope, and an orientation sensor.

8. The method of claim 7, wherein the screen is a touch-sensitive surface.

9. The method of claim 7, wherein determining the screen tapping score further comprises eliminating a subset of the detected taps from further processing in response to determining that each of the subset is associated with a speed of the user device below a predetermined threshold.

10. The method of claim 9, wherein determining the screen tapping score further comprises eliminating a second subset of the detected taps from further processing in response to determining that each of the second subset is associated with processing activity of the user device below a second predetermined threshold.

11. A system for assessing usage of a user device by a driver while driving a vehicle, the system comprising:
    a set of processors in communication with an application executing on the user device, the set of processors configured to:
        collect a dataset from the user device;
        based on the dataset, determine a state of a set of states of the user device, wherein the set of states comprises:
            a stationary state of the user device relative to the vehicle,
            a non-stationary state of the user device relative to the vehicle;
        based on the state being the non-stationary state, determine a classification of a set of classifications of the user device, wherein the set of classifications comprises one or more classifications related to whether the driver is engaged in a phone call;
        based on the classification, determine a handling score associated with the user device in the non-stationary state, the handling score indicating a type of handling of the user device among a plurality of types of handling of the user device; determine a risk score for the driver based on the handling score; and
        produce an output based on the risk score.

12. The system of claim 11, wherein the set of classifications comprises a reading classification.

13. The system of claim 11, wherein the handling score is determined based on at least a first classification corresponding to the driver being engaged in the phone call and at least a second classification corresponding to the driver interacting with the user device in a way different than being engaged in the phone call.

14. The system of claim 13, wherein the second classification comprises a reading classification.

15. The system of claim 11, wherein the set of processors is further configured to determine a screen tapping score associated with the driver interacting with a screen of the user device in the stationary state, wherein the screen tapping score is determined separately from the handling score, and wherein the risk score is further determined based on the screen tapping score.

16. The system of claim 15, wherein the screen tapping score is further associated with the driver interacting with the screen of the user device while the user device is arranged in a mount.

17. The system of claim 15, wherein to determine the screen tapping score, the set of processors is further configured to detect a set of taps on the screen, the set of taps detected based on motion information collected from at least one of the following sensors arranged onboard the user device: an accelerometer, a gyroscope, and an orientation sensor.

18. The system of claim 17, wherein the screen is a touch-sensitive surface.

19. The system of claim 17, wherein to determine the screen tapping score, the set of processors is further configured to eliminate a subset of the detected taps from further processing in response to determining that each of the subset is associated with a speed of the user device below a predetermined threshold.

20. The system of claim 17, wherein to determine the screen tapping score, the set of processors is further configured to eliminate a subset of the detected taps from further processing in response to determining that each of the subset is associated with processing activity of the user device below a predetermined threshold.

* * * * *